J. H. TABLER.
FAN BELT CONNECTION.
APPLICATION FILED MAY 29, 1920.
1,411,595. Patented Apr. 4, 1922.
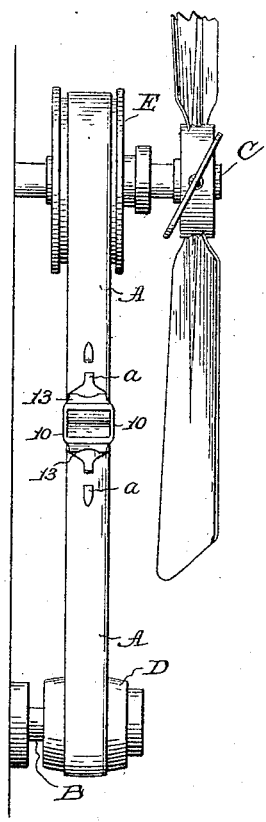
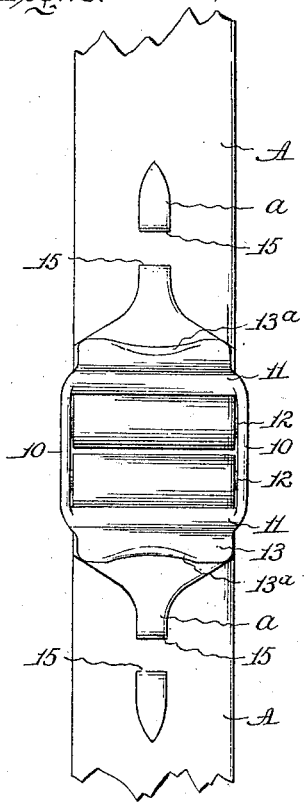
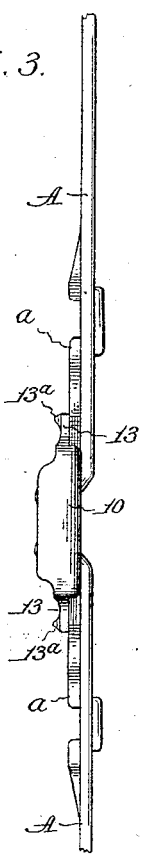
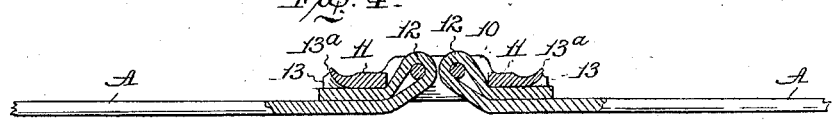
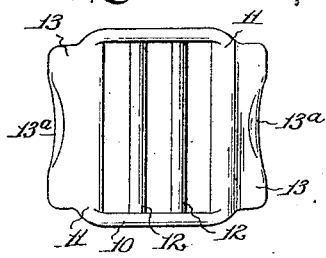
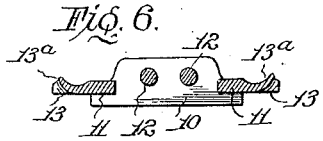
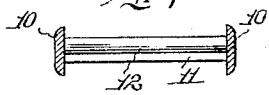
John Howard Tabler,
INVENTOR.
By Horace S. Beall
ATTORNEY.

UNITED STATES PATENT OFFICE.

JOHN HOWARD TABLER, OF WASHINGTON, DISTRICT OF COLUMBIA.

FAN-BELT CONNECTION.

1,411,595.  Specification of Letters Patent.  Patented Apr. 4, 1922.

Application filed May 29, 1920. Serial No. 385,110.

*To all whom it may concern:*

Be it known that I, JOHN HOWARD TABLER, a citizen of the United States, residing at Washington, District of Columbia, have invented a Fan-Belt Connection, of which the following is a specification.

The primary object of my invention is to provide a simple form of device for connecting the ends of a belt which can be readily and conveniently applied to a length of belt material without the employment of tools, and by the use of which any slack in the belt may be quickly taken up by merely pulling upon either projecting end of said belt.

A further object of my invention is to provide for making a machine belt that will be cheap in construction, effective in maintaining its adjustment in use, and in which no metal part comes in contact with the pulleys to cause wear on said pulleys or otherwise affect the proper running of the belt.

Other objects and advantages of my invention will hereinafter appear, and what I claim as new and desire to protect by Letters-Patent is particularly set forth in the appended claim.

In the accompanying drawings:

Fig. 1 is a view illustrating the application of my invention to a fan-belt.

Fig. 2 is an enlarged plan view of the connection or fastening device showing the ends of the belt connected thereto.

Fig. 3 is an edge view of the parts illustrated in Fig. 2.

Fig. 4 is a longitudinal sectional view through the fastening device and belt, and including a modification in the arrangement for the terminals of the belt.

Fig. 5 is a detail plan view of the fastening device, and

Figs. 6 and 7 are longitudinal and transverse sectional views through the same.

My invention is intended for use in connection with machine belts, and is especially adapted for the fan belts of automobiles, particularly of that type commonly known as a Ford, and therefore in Fig. 1 I have shown it in this situation; A designating the belt having my improved fastening device and connecting the driving-shaft B to the fan-shaft C by passing over the pulleys D and E on said shafts, respectively; but it will be understood, of course, that the belt fastening device or connecting means may be used for connecting the ends of a belt or strap used in other situations and for other purposes.

In carrying out my invention the belt connection or fastening device is made up of a single piece or casting to provide spaced apart parallel side pieces 10, 10, with cross-pieces extending between the ends thereof, respectively, and with intermediate cross-bars 12, 12, also extending between said side pieces and located with respect to the cross-pieces so as to cooperate therewith in connecting the ends of the belt to the opposite ends of the device; the aforesaid end cross-pieces being widened or extended forwardly, as at 13, to provide lips which serve the purpose of confining the extreme ends of terminals of the belt against the body portion thereof to increase the frictional engagement and dispense with a loose end at either end of the fastening device. As will be obvious, both ends of the belt fastening device are constructed exactly alike, and therefore each end is provided with a widened cross-piece and cooperating cross-bar adjacent thereto; and in forming said device the lower edges of the cross-pieces are preferably disposed a short distance above the lower edges of the side pieces 10, and each cross-bar is located above the plane of the lower edge of its companion cross-piece. As will be further noted, the device is substantially rectangular in shape with the projecting lip at each end of slightly less width than the body portion of the device or approximating the width of the space between the side pieces and therefore of about the same width as the belt, which latter when applied fits between said side pieces, and the ends of said side pieces, as well as the upper and lower outer edges thereof, may be rounded, as shown.

In connecting the ends of a belt by means of my improved fastening device one end of the belt is first attached to said device by passing it around a cross-bar 12 from the inner side thereof and bringing the terminal portion out under the companion cross-piece 11 and lip 13 between these last mentioned parts and body of the belt; then after fitting the belt around the pulleys the other end thereof is in like manner looped around the cross-bar and passed under the cross-piece and lip at the other end of the device, and, finally, the belt is tightened to the desired extent by pulling on either projecting end thereof. The loose ends of the belt may be cut off at the outer edges of the lips, or attached to the body of the belt, as hereinafter explained. As will be apparent the operation of attaching the ends of the belt to the fastening device is accomplished very quickly and without the employment of tools, and the ends of the belt are firmly and securely connected by frictional engagement with the cross-bars and cooperating widened cross-pieces, the latter also binding the terminals against the body of the belt to prevent them from flapping or fraying out.

In the operation of tightening the belt one end of the fastening device is lifted slightly to relieve the frictional engagement of the looped end of the belt with the widened cross-piece and permit it to slip over the companion cross-bar, and for convenience in manipulating the device in this operation the center portion of the outer edge of each lip is undercut or turned up, as at 13ᵃ, to provide a finger-hold; it being understood, of course, that the slack in the belt may be taken up at either end of the device. When the belt is adjusted the pull on the same in operation will not affect the firm connection of the ends of said belt with the opposite ends of the fastening device, for the greater the strain on the belt the tighter the frictional engagement will be, so that after the belt is adjusted it will not become loose through any fault of the fastening device. As no part of the fastening device cuts into or otherwise injures the belt material there is no wear on the latter at this point, or any possibility of its becoming disconnected; and, furthermore, as no part of the fastening device comes in contact with the pulleys there is no wear on the latter to affect the proper running of the belt.

Any suitable belt material may be used in connection with the fastening device in making up a machine belt, and when cotton webbing is employed I prefer to cut off the projecting ends or terminals at the outer edge of the lips, for the reason hereinbefore stated; but when a leather strap is used it may be found more desirable to attach the projecting loose ends, as $a$, to the body portion of the belt by forming slits 15 in the latter and threading said loose ends in and out through said slits after reducing them to the proper width corresponding with the slits.

The undercut recesses or turned up portions 13ᵃ at the outer edges of the binding lips in addition to providing a finger hold in manipulating the fastening device to tighten the belt also provides for grasping the cut off end of the belt either by the fingers or a pair of pliers.

Inasmuch as the belt fastening device is especially adapted for use in connection with the fan mechanism of a Ford automobile in which there are parts (not shown) adjoining the pulley D with which said device and the belt may come in contact or strike the side pieces 10, 10 are preferably extended above the cross-bars 12, 12, as shown in the drawings, so as to protect those portions of the belt material that are looped over said cross-bars.

Some of the important advantages of the belt fastening device constructed in accordance with my invention may be mentioned, as follows: that it can be manufactured at small cost; it can be readily and conveniently applied to a length of belt material without the employment of tools of any kind; it will permit the belt to be quickly adjusted around the pulleys and will maintain the adjustment; it can be quickly manipulated to take up any slack in the belt that may occur from stretching of the material of the belt, and inasmuch as there is no appreciable wear on said fastening device it may be readily removed from an old belt and used in connection with a new strip of belt material.

Having described my invention, I claim:—

A fastening device for machine belts comprising side pieces, cross-bars between the side pieces near the ends thereof over which the ends of the belt are looped with the side pieces extended above said cross-bars to protect the edges of the belt, cross-pieces between the ends of the side pieces and each having a projecting portion beyond said side pieces of a width approximating the width of the belt to bear upon the latter and increase frictional contact of the buckle therewith, the projecting portion of each cross-piece being provided centrally with a recess at its under side, substantially as shown and for the purpose set forth.

JOHN HOWARD TABLER.